(12) United States Patent
Wang et al.

(10) Patent No.: US 11,892,841 B2
(45) Date of Patent: Feb. 6, 2024

(54) DISTRIBUTED SENSING FOR VEHICLE NAVIGATION

(71) Applicant: Pony AI Inc., Grand Cayman (KY)

(72) Inventors: Jianan Wang, San Jose, CA (US); Nengxiu Deng, Fremont, CA (US); Xiang Yu, Santa Clara, CA (US); Tiancheng Lou, Milpitas, CA (US); Jun Peng, Fremont, CA (US); Kai Chen, San Jose, CA (US); Hao Song, Sunnyvale, CA (US)

(73) Assignee: Pony AI Inc., Grand Cayman (KY)

( * ) Notice: Subject to any disclaimer, the term of this patent is extended or adjusted under 35 U.S.C. 154(b) by 277 days.

(21) Appl. No.: 16/880,046

(22) Filed: May 21, 2020

(65) Prior Publication Data

US 2020/0285236 A1 Sep. 10, 2020

Related U.S. Application Data

(63) Continuation of application No. 16/117,494, filed on Aug. 30, 2018, now Pat. No. 10,698,408.

(51) Int. Cl.
*G05D 1/00* (2006.01)
*G05D 1/02* (2020.01)

(52) U.S. Cl.
CPC ......... *G05D 1/0088* (2013.01); *G05D 1/0285* (2013.01); *G05D 1/0287* (2013.01); *G05D 2201/0213* (2013.01)

(58) Field of Classification Search
CPC .. G05D 1/0088; G05D 1/0285; G05D 1/0287; G05D 2201/0213; G05D 2201/0212; G08G 1/096827
See application file for complete search history.

(56) References Cited

U.S. PATENT DOCUMENTS

| 6,076,041 | A | 6/2000 | Watanabe |
| 6,212,473 | B1 | 4/2001 | Stefan |
| 6,308,134 | B1 | 10/2001 | Croyle |

(Continued)

OTHER PUBLICATIONS

Luan, S., Qiu, T., Song, A., Wang, P., Li, J. and Tan, H. (2016), Automatic dependent surveillance-broadcast time delay estimation based on extended recursive maximum correntropy algorithm. IET Radar Sonar Navig., 10: 1500-1507. https://doi.org/10.1049/iet-rsn.2015.0628.*

*Primary Examiner* — Jeff A Burke
*Assistant Examiner* — Blake A Wood

(57) ABSTRACT

A set of sensor information may include first sensor information generated based on a first sensor of a first vehicle and second sensor information generated based on a second sensor of a second vehicle. Individual sensor information may characterize positions of objects in an environment of individual sensors. Relevant sensor information for a vehicle may be determined based on the set of sensor information and a position of the vehicle. The relevant sensor information may characterize positions of objects in a maneuver environment of the vehicle. A desired navigation of the vehicle in the maneuver environment of the vehicle may be determined based on the relevant sensor information. An instruction may be provided to the vehicle based on the desired navigation of the vehicle. The instruction may characterize one or more maneuvers to be performed by the vehicle to execute the desired navigation.

18 Claims, 7 Drawing Sheets

(56) References Cited

U.S. PATENT DOCUMENTS

| | | | |
|---|---|---|---|
| 9,459,623 B1* | 10/2016 | Raghu | B60W 30/18154 |
| 10,053,088 B1* | 8/2018 | Askeland | B60W 30/18 |
| 10,395,332 B1* | 8/2019 | Konrardy | G05D 1/0246 |
| 10,486,485 B1* | 11/2019 | Levinson | B60G 17/0162 |
| 2007/0021915 A1* | 1/2007 | Breed | G08G 1/166 |
| | | | 701/301 |
| 2012/0083960 A1* | 4/2012 | Zhu | B60R 1/00 |
| | | | 701/23 |
| 2013/0103781 A1* | 4/2013 | Mori | H04L 1/0084 |
| | | | 709/213 |
| 2018/0111274 A1 | 4/2018 | Seok | |
| 2018/0210464 A1* | 7/2018 | Switkes | G08G 1/163 |
| 2018/0272963 A1* | 9/2018 | Meyhofer | G01S 13/862 |
| 2018/0330509 A1 | 11/2018 | Watanabe | |
| 2018/0339703 A1 | 11/2018 | Nix | |
| 2019/0033459 A1 | 1/2019 | Tisdale | |
| 2019/0111930 A1* | 4/2019 | Katsura | G06V 20/58 |
| 2019/0113351 A1 | 4/2019 | Antony | |
| 2019/0118829 A1* | 4/2019 | Goldberg | B60W 30/18 |
| 2019/0143967 A1* | 5/2019 | Kutila | B60W 50/14 |
| | | | 701/23 |
| 2019/0147745 A1* | 5/2019 | Kim | G05D 1/0295 |
| | | | 701/301 |
| 2019/0204089 A1 | 7/2019 | Rochan Meganathan | |
| 2020/0005058 A1* | 1/2020 | Mielenz | G01C 21/30 |
| 2020/0057453 A1 | 2/2020 | Laws | |

\* cited by examiner

DISTRIBUTED SENSING FOR VEHICLE NAVIGATION

CROSS-REFERENCE TO RELATED APPLICATION

This application is a continuation of U.S. application Ser. No. 16/117,494, filed Aug. 30, 2018, the content of which is hereby incorporated herein by reference.

FIELD OF THE INVENTION

This disclosure relates to approaches for providing vehicle navigation using sensors installed in the vehicle as well as those in nearby vehicles and/or other facilities.

BACKGROUND

Under conventional approaches, an autonomous vehicle may use data collected from its sensors to identify objects in its surroundings and determine its navigation based on its sensor data. Such determination of autonomous vehicle navigation may be limited by the sensing capabilities of the vehicle sensors. Data from the vehicle sensors may not provide comprehensive information regarding objects in the vehicle environment. For example, the vehicle sensors may not have the capability to detect certain objects or may be limited from detecting certain objects due to environmental configurations. For instance, a vehicle may include a camera and an object in the environment of the vehicle may not be detected by the camera due to the object not being within the field of view of the camera or being blocked from being viewed by the camera by another object.

SUMMARY

Various embodiments of the present disclosure may include systems, methods, and non-transitory computer readable media configured to facilitate provision of vehicle navigation using distributed sensors. A set of sensor information may be obtained. The set of sensor information may include first sensor information generated based on a first sensor of a first vehicle and second sensor information generated based on a second sensor of a second vehicle. Individual sensor information may characterize positions of objects in an environment of individual sensors. Relevant sensor information for a vehicle may be determined based on the set of sensor information and a position of the vehicle. The relevant sensor information may characterize positions of objects in a maneuver environment of the vehicle. A desired navigation of the vehicle in the maneuver environment of the vehicle may be determined based on the relevant sensor information. An instruction may be provided to the vehicle based on the desired navigation of the vehicle. The instruction may characterize one or more maneuvers to be performed by the vehicle to execute the desired navigation.

In some embodiments, the vehicle may include the first vehicle or the second vehicle. In some embodiments, the vehicle may include a third vehicle. The set of sensor information may not include third sensor information generated based on a third sensor of the third vehicle.

In some embodiments, the first sensor may be of a first sensor type and the second sensor may be of a second sensor type different from the first sensor type. In some embodiments, capabilities of the first sensor and the second sensor may be different.

In some embodiments, the set of sensor information may further include third sensor information generated based on a third sensor. The third sensor may be affixed to a location. The third sensor information may characterize positions of objects in an environment of the third sensor.

In some embodiments, the first sensor information may characterize a position of an object not characterized by the second sensor information based on the object being located in the environment of the first sensor and not located in the environment of the second sensor.

In some embodiments, the relevant sensor information for the vehicle may be determined further based on a movement of the vehicle.

In some embodiments, the first sensor information may be arranged according to a first data format and the second sensor information may be arranged according to a second data format different from the first data format. Obtaining the first sensor information and the second sensor information may include arranging the first sensor information and the second sensor information according to a standard data format.

In some embodiments, the first sensor information may characterize an absolute position of a first object in a first environment of the first sensor, and the second sensor information may characterize a relative position of a second object in a second environment of the second sensor with respect to the second sensor and an absolute position of the second sensor.

In some embodiments, the first sensor information may further characterize a movement of the first object. A current position of the first object may be estimated based on the absolute position of the first object and the movement of the first object.

In some embodiments, a change to a terrain in a location may be determined based on the set of sensor information. A map for the location may be modified based on the change to the terrain.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
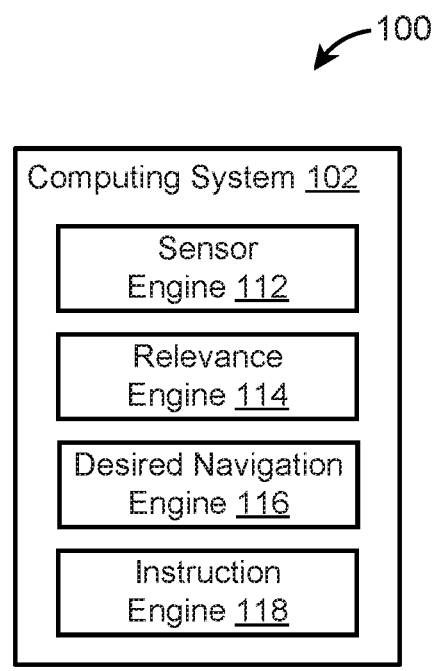
FIG. 1 illustrates an example environment for providing vehicle navigation using distributed sensors, in accordance with various embodiments.

In various implementations, a computing system may obtain a set of sensor information. The set of sensor information may include different sensor information generated based on sensors of multiple vehicle. Individual sensor information may characterize positions of objects in an environment of individual sensors. Relevant sensor information for a vehicle may be determined based on the set of sensor information and a position of the vehicle. The vehicle for which the relevant sensor information is determined may include one of the vehicles that provided sensor information or a vehicle that did not provide sensor information. The relevant sensor information may characterize positions of objects in a maneuver environment of the vehicle. A desired navigation of the vehicle in the maneuver environment of the vehicle may be determined based on the relevant sensor information. An instruction may be provided to the vehicle based on the desired navigation of the vehicle. The instruction may characterize one or more maneuvers to be performed by the vehicle to execute the desired navigation.

The sensors of multiple vehicles may include sensors of the same type or sensors of different types. For example, the sensors of multiple vehicle may include a first sensor of a first vehicle and a second sensor of a second vehicle. The first sensor may be of a first sensor type and the second sensor may be of a second sensor type different from the first sensor type. As another example, capabilities of the first sensor and the second sensor may be different.

The set of sensor information may further include sensor information generated based on a non-vehicle sensor. For example, the set of sensor information may include sensor information generated based on a sensor affixed to a location.

Different sensor information may characterize positions of different objects. For example, first sensor information generated based on the first sensor may characterize a position of an object based on the object being located in the environment of the first sensor. Second sensor information generated based on the second sensor may not characterize the position of the object based on the object not being located in the environment of the second sensor.

Different sensor information may characterize positions of objects differently. For example, the first sensor information may characterize an absolute position of a first object in an environment of the first sensor, and the second sensor information may characterize a relative position of a second object in an environment of the second sensor with respect to the second sensor and an absolute position of the second sensor. Sensor information may also characterize movement of one or more objects. For example, the first sensor information may characterize a movement of the first object. A current position of the first object may be estimated based on the absolute position of the first object and the movement of the first object. As another example, the second sensor information may characterize a movement of the second object. A current position of the second object may be estimated based on the relative position of a second object with respect to the second sensor, the absolute position of the second sensor, and the movement of the second object.

Different sensor information within the set of sensor information may be arranged according to different data formats. For example, the first sensor information may be arranged according to a first data format and the second sensor information may be arranged according to a second data format different from the first data format. Obtaining the first sensor information and the second sensor information may include arranging the first sensor information and the second sensor information according to a standard data format.

The relevant sensor information for the vehicle may be determined further based on a movement of the vehicle. That is, both the position and the movement of the vehicle may be used to determine the relevant sensor information for the vehicle.

One or more changes to a terrain in a location may be determined based on the set of sensor information. For example, a change to a road in a location covered by the set of sensor information may be determined based on the set of sensor information, where the set of sensor information includes sensor information generated at different times. A map for the location may be modified based on the change(s) to the terrain.

The approaches disclosed herein enables provision of vehicle navigation using distributed sensors. Navigation information may be provided to a vehicle based on sensor information generated by one or more sensors external to the vehicle. For example, sensor information generated by sensors from multiple vehicles in an environment and/or sensor information generated by fixed sensors in the environment may be aggregated to provide vehicle navigation for one or more vehicles in the environment. That is, one or more vehicles in the environment may benefit from the sensor information generated by sensor(s) of other vehicles and/or devices.

While the disclosure is described herein with respect to providing navigation for automobiles using distributed sensors, this is merely for illustrative purposes and is not meant to be limiting. The approach disclosed herein may be used to provide navigation for a variety of vehicles. A vehicle may refer to a thing used for transportation. A vehicle may travel on land, on water, under the water, and/or in the air. For example, a vehicle may refer to an automobile, a train, a boat, a ship, a submarine, an airplane, a remote-controlled vehicle, or other vehicle. A vehicle may include an autonomous vehicle. An autonomous vehicle may refer to a vehicle that is capable of navigating without human input. An autonomous vehicle may be fully autonomous or partially autonomous.

The approach disclosed herein may be used to provide navigation for different types of vehicles. The approach disclosed herein may be used to provide navigation for vehicles in different types of locations (e.g., on the road, off the road, on a driving track, in the air, in the water). The approach disclosed herein may be used to enable vehicles to share sensor information generated by individual vehicles and/or sensor(s) of individual vehicles. The approach disclosed herein may be used to enable vehicles to share other types of information. For example, the approach disclosed herein may be used to enable vehicles to share entertainment information, advertisement information, and/or other types of information.

FIG. 1 illustrates an example environment 100 for providing vehicle navigation using distributed sensors, in accordance with various embodiments. The example environment 100 may include a computing system 102. The computing system 102 may include one or more processors and memory. The processor(s) may be configured to perform various operations by interpreting machine-readable instructions stored in the memory. The environment 100 may also include one or more datastores that are accessible to the computing system 102 (e.g., stored in the memory of the computing system 102, coupled to the computing system, accessible via one or more network(s)). In some embodiments, the datastore(s) may include various databases, application functionalities, application/data packages, and/or other data that are available for download, installation, and/or execution.

In various embodiments, the computing system 102 may include a sensor engine 112, a relevance engine 114, a desired navigation engine 116, an instruction engine 118, and/or other engines. While the computing system 102 is shown in FIG. 1 as a single entity, this is merely for ease of reference and is not meant to be limiting. One or more components/functionalities of the computing system 102 described herein may be implemented, in whole or in part, within a single computing device or within multiple computing devices. One or more portions of the computing system 102 may be implemented within a vehicle (e.g., autonomous vehicle). One or more portions of the computing system may be implemented remotely from a vehicle (e.g., server).

In various embodiments, the sensor engine 112 may be configured to obtain one or more sets of sensor information. Obtaining sensor information may include accessing, acquiring, analyzing, determining, examining, identifying, loading, locating, opening, receiving, retrieving, reviewing, storing, and/or otherwise obtaining the sensor information. Sensor information may be obtained from hardware and/or software. Sensor information may be obtained from a device that generated the sensor information and/or other devices. For example, the sensor engine 112 may obtain sensor information from a sensor that generated the sensor information, a vehicle including the sensor that generated the sensor information, a communication device (e.g., router, server) that collects, conveys, and/or forwards the sensor information generated by other devices, and/or from other locations. Sensor information may be obtained from one or more storage locations. A storage location may refer to electronic storage located within the computing system 102 (e.g., integral and/or removable memory of the computing system 102), electronic storage coupled to the computing system 102, and/or electronic storage located remotely from the computing system 102 (e.g., electronic storage accessible to the computing system 102 through a network). Sensor information may be stored within a single file or across multiple files.

A set of sensor information may include one or more sensor information generated by one or more sensors. A sensor may refer to a device that detects and/or measures one or more physical properties. A sensor may record, indicate, and/or otherwise respond to the detected and/or measured physical propert(ies). For example, a sensor may include one or more of an image sensor, a vehicle speed sensor, a wheel speed sensor, a proximity sensor, an accelerometer, a tilt sensor, an inclination sensor, an angular rate sensor, a gyroscope, an inertial measurement unit, a LIDAR sensor, a location sensor, a motion sensor, a magnetometer, a radar detector, a radar sensor, a light detection sensor, an engine control unit sensor, an audio sensor, a temperature sensor, a humidity sensor, a weather sensor, and/or other sensors. A sensor may be part of a vehicle, may be mechanically, electrically, and/or communicatively coupled to the vehicle, and/or may be remote from the vehicle. A sensor may be positioned within a vehicle and/or positioned outside the vehicle. For example, sensor information may be generated by a sensor carried by a vehicle, such as a LIDAR sensor, that determines locations and/or movements of objects around the vehicle. As another example, sensor information may be generated by a sensor positioned in the environment of the vehicle, such as a camera attached to a light signal, a lamp post, and/or a structure, that determines locations and/or movements object in around the sensor.

Sensor information may refer to data and/or signal generated by a sensor, and/or information generated based on the data and/or signal generated by a sensor. For example, sensor information may refer to information conveyed by the data and/or signal generated by a sensor. Sensor information may be generated in response to the sensor detecting and/or measuring physical propert(ies). Individual sensor information may characterize positions of objects in an environment of individual sensors. An environment of a sensor may refer to one or more physical areas of the sensor, such as one or more portions of surroundings of the sensor. Objects in an environment of a sensor may refer to living things and/or non-living things in the surroundings of the sensor, such as a vehicle, a road marker (e.g., two dimensional and/or three-dimensional markings on the road), a structure (e.g., building, tree, mailbox, light pole, traffic light, road sign), a person, an animal, and/or other objects in the environment of the sensor.

Sensor information's characterization of positions objects in an environment of a sensor may include sensor information including values and/or other data that are indicative and/or descriptive of the positions of objects in the environment of the sensor, such as absolute positions of the objects, relative positions of the objects with respect to the sensor position, orientations of the objects with respect to a frame of reference (e.g., orientations of the objects with respect to the sensor), and/or other position information of the objects in the environment of the sensor. Sensor information's characterization of positions objects in an environment of a sensor may include sensor information including values and/or other data that are indicative and/or descriptive of the changes in positions of objects in the environment of the sensor, such as changes in absolute positions of the objects, changes in relative positions of the objects with respect to the sensor position, changes in orientations of the objects with respect to a frame of reference (e.g., changes in orientations of the objects with respect to the sensor), and/or other position change information of the objects in the environment of the sensor. For example, sensor information may characterize a position of an object in an environment of a sensor by providing information on the position of the object with respect to the sensor, such as the distance (e.g., lateral distance, vertical distance) between the object and the sensor, the angle at which the object is located from the sensor, the direction in which the object is facing with respect to the sensor, movement (e.g., translational movement, rotational movement) of the object with respect to the sensor, and/or other information relating to the position of the object.

Individual sensor information may characterize other aspects of the environment of individual sensors. For example, sensor information may characterize operating status of object(s) in the environment and/or how the object(s) are acting. For instance, the sensor information may provide information on how a nearby vehicle is operating, the status of a nearby traffic light (e.g., green, yellow, red, flashing yellow), how a person inside a vehicle (e.g., driver, passenger) is acting, and/or other information relating to the object(s).

A set of sensor information obtained by the sensor engine 112 may include different sensor information generated based on sensors of multiple vehicles. For example, a set of sensor information may include multiple sensor information generated based on sensors of multiple vehicles. For instance, a set of sensor information may include sensor information generated based on a sensor of a vehicle and sensor information generated based on a sensor of another vehicle. A set of sensor information obtained by the sensor engine 112 may include sensor information generated based on one or more non-vehicle sensors. For example, a set of sensor information may include sensor information generated based on a sensor affixed to a location (a sensor on a light signal, a lamp post, and/or a structure).

Different sensor information may be gathered together for use based on point-by-point communication and/or server-node communication. For example, sensor information generated based on sensors of different vehicles may be communicated between different vehicles on a point-by-point basis (e.g., from vehicle to vehicle) and gathered at different vehicles for use and/or provided to a local server for use. As another example, sensor information generated based on sensors of different vehicles may be communicated to a server for storage and/or use. For example, a server (e.g., a central server located remotely from vehicles and/or local server near the vehicles) may gather sensor information generated based on different sensors and use the set of sensor information to provide vehicle navigation for one or more vehicles. As another example, a server may gather sensor information generated based on different sensors and provide the set of sensor information to different vehicles for individual vehicles to determine its own vehicle navigation.

Different sensor information may characterize positions of different objects. Different sensor information may characterize positions of different objects based on different locations and/or positioning of the different sensors. For instance, different sensor information may characterize positions of different objects based on sensors being located at different locations and/or sensors being directed to detect and/or measure one or more physical properties in different areas. For example, different cameras may detect and/or identify positions of objects in different locations based on the cameras being located at different positions and/or the cameras being pointed in different directions. As another example, sensor information generated based on a first sensor may characterize a position of an object based on the object being located in the environment of the first sensor while sensor information generated based on a second sensor may not characterize the position of the object based on the object not being located in the environment of the second sensor.

The set of sensor information obtained by the sensor engine 112 may be used to determine a desired navigation of a vehicle. The set of sensor information obtained by the sensor engine 112 may include sensor information generated by a sensor of the vehicle for which the desired navigation is determined. For example, the set of sensor information may include sensor information generated based on a sensor of a particular vehicle, and the set of sensor information may be used to determine a desired navigation of the particular vehicle. The set of sensor information obtained by the sensor engine 112 may not include sensor information generated by a sensor of the vehicle for which the desired navigation is determined. For example, the set of sensor information may not include sensor information generated based on a sensor of a particular vehicle, and the set of sensor information may be used to determine a desired navigation of the particular vehicle.

The set of sensor information may include multiple sensor information generated based on sensors of the same type and/or sensors of different types. For example, the set of sensor information may include multiple sensor information generated based on sensors of multiple vehicles, such as a sensor of a first vehicle and a sensor of a second vehicle. The sensor of the first vehicle may be of one sensor type and the sensor of the second vehicle may be of the same sensor type or another sensor type (different from the sensor type of the first vehicle sensor). A type of a sensor may refer to a category of sensor having one or more common characteristics. For example, an image sensor type may include sensors that detect and/or measure one or more physical properties using light received on the surface of the sensors and a laser sensor type may include sensors that detect and/or measure one or more physical properties using measurements of laser beams/pulses. The set of sensor information may include multiple sensor information generated based on sensors of the same type (e.g., LIDAR) and/or sensors of different types (e.g., LIDAR and cameras).

The set of sensor information may include multiple sensor information generated based on sensors of the same capability and/or sensors of different capabilities. For example, the set of sensor information may include multiple sensor information generated based on sensors of multiple vehicles, such as a sensor of a first vehicle and a sensor of a second vehicle. The capability of the sensor of the first vehicle may be the same or different from the capability of the sensor of the second vehicle. A capability of a sensor may refer to a quality or a state of the sensor's ability to detect and/or measure one or more physical properties. A capability of a sensor may be static or dynamic. That is, the capability of a sensor may remain the same or change over changes in time, changes in location, and/or other changes. For example, the sensor of the first vehicle may include a high fidelity (e.g., high resolution, high accuracy, and/or high scan rate) sensor while the sensor of the second vehicle may include a low fidelity (e.g., low resolution, low accuracy, and/or low scan rate) sensor. A capability of a sensor may depend on its operating condition or its environment. For example, multiple vehicles with the same sensor type may be lined up in a single lane. The vehicle in the front of the line-up may have greater sensing capability of the front of the vehicles because its sensor is not obstructed by other vehicles. For instance, the lane may include a curve, and when the vehicles in the line begin to move along the curve, the sensor of the vehicle in the front of the line may have the capability to observe more information about the curve and/or the capability to observe information about the curve earlier than other vehicles in the line. As another example, multiple vehicles may be traveling in heavy fog condition, and sensors of individual vehicles may have limited and different vision due to the fog.

Sensor information generated based on a sensor may be filtered to provide relevant information. Filtering of the sensor information may include identification/extraction of one or more portions of the sensor information that has significance in determining vehicle navigation and/or removal of one or more portions of the sensor information that does not have significance (e.g., at all or not reach a significance threshold) in determining vehicle navigation. For example, sensor information may be filtered to include information on positions of objects in an environment that will impact vehicle navigation within the environment while filtering out inconsequential information. As another example, sensor information may include different levels of alerts relating to a location and the sensor information may be filtered based on a threshold level of alert. For instance, the sensor information may be filtered to include both minor and major alerts or may be filtered to include just major alerts. Sensor information may be filtered before the sensor information is obtained by the sensor engine 112 and/or after the sensor information has been obtained by the sensor engine 112. The filtering of the sensor information may be performed by the sensor/device that generated the sensor information, a device that collected the sensor information (e.g., the computing system 102, the sensor engine 112), and/or another device.

Different sensor information within a set of sensor information may characterize positions of objects differently. For example, a set of sensor information may include one sensor information that provides information on absolute position of an object and another sensor information that provides information on relative position of an object. For instance, the set of sensor information may include first sensor information generated based on a sensor of a first vehicle and second sensor information generated based on a sensor of a second vehicle. The first sensor information may characterize an absolute position (e.g., global position, a combination of latitude, longitude, and/or altitude) of an object in an environment of the first sensor while the second sensor information may characterize a relative position (e.g., distance, angle, orientation) of an object in an environment of the second sensor with respect to the second sensor and an absolute position of the second sensor.

Sensor information may characterize movement (translational velocity/acceleration, rotational velocity/acceleration) of one or more objects. For example, the first sensor information may characterize movement of the object in the environment of the first sensor. A current position of the object may be estimated based on the absolute position of the object and the movement of the object. As another example, the second sensor information may characterize movement of the object in the environment of second first sensor. A current position of the object may be estimated based on the relative position of the object with respect to the second sensor, the absolute position of the second sensor, and the movement of the object. The use of the movement of the object to estimate the current position of the object may account for time delay in sharing, collection, and/or processing of sensor information. For example, given the time required for sensor information to be obtained and/or processed, the position information contained within sensor information may become obsolete. That is, for time sensitive information, such as positions of moving objects, simply sharing where objects were located in the past may not be sufficient to enable vehicle navigation. To account for the time delay in obtaining and/or processing sensor information, the data on the movement of objects may be utilized to update the position information contained within the sensor information.

Different sensor information within a set of sensor information may be arranged according to different data formats. A data format may refer to a way in which information is arranged and/or set out. For example, the set of sensor information first sensor information generated based on a first sensor and second sensor information generated based on a second sensor. The first sensor information may be arranged according to a first data format and the second sensor information may be arranged according to a second data format different from the first data format.

The sensor engine 112 may arrange one or more of the sensor information within the set of sensor information according to a standard data format. A standard data format may refer to a standard way in which information is arranged and/or set out. A standard data format may be used to bring together sensor information arranged according to different formats. For example, obtaining a set of sensor information including first sensor information arranged according to a first data format and the second sensor information arranged according to a second data format different from the first data format may include arranging the first sensor information and the second sensor information according to a standard data format. The arrangements of different sensor information according to the standard data format may result in standardization of different sensor information. The standardization of different sensor information may facilitate use of the different sensor information for vehicle navigation analysis and/or interpretation of data from different sensors.

The standardization of sensor information may include processing of raw data from one or more sensors to extract information that is useful in determining vehicle navigation. For example, a first vehicle may include a camera and a second vehicle may include a LIDAR. The sensor information generated by the camera may include an image of object(s) in the environment of the camera/first vehicle while the sensor information generated by the LIDAR may include a three-dimensional point cloud of object(s) in the environment of the LIDAR/second vehicle. Simply combining the image data and the three-dimensional point cloud data may not be useful in determining vehicle navigation. Rather, the data within one or more of the sensor information may be processed to provide the same type of information. For example, the same type of position information of the objects (e.g., absolute position information) may be determined from the image data and the three-dimensional point cloud data.

As another example, a set of sensor information may include one sensor information that provides information on absolute positions of objects and another sensor information that provides information on relative positions of objects. The data within one or more of the sensor information may be processed to provide the same type of information. For example, the information on relative positions of objects may be processed using information on absolute positions of sensors to provide absolute positions of objects. The processing of sensor information for standardization may be performed by the sensor/device that generated the sensor information, a device that collected the sensor information (e.g., the computing system 102, the sensor engine 112), and/or another device. The processing of sensor information for standardization may be performed when the sensor information is generated, when the sensor information is received/collected, and/or when the sensor information is needed for vehicle navigation determination.

One or more changes to a terrain in a location may be determined based on the set of sensor information. A location may refer to a particular geographic place or position. A location may include a geographic area. A terrain may refer to a portion of the location. A terrain may refer to one or more physical features of the location. For example, a terrain in a location may refer to land/road characteristics, such as existence of one or more roads in a geographic area, the width of the road(s), the length of the road(s), the number of lanes on the road(s), the slope of the road(s), the curve of the road(s), and/or other characteristics of the lane/road that impacts navigation of vehicles within the location. Based on the sensor information obtained from a variety of sensors, one or more changes to a terrain in a location may be determined. For example, at least one of the sensor information in the set of sensor information may indicate that there is a change in a road in a location, such as expansion of the road, repair of the road, closure of the road, and/or other change relating to the road. As another example, multiple sensor information within a set of sensor information may be used to determine changes to a terrain in a location. That is, multiple sensor information from multiple sensor information may be used to verify that change(s) have been made to the terrain. As yet another example, sensor information generated at different times may be used to keep track of changes to the terrain as a function of time.

A map for the location may be modified based on the change(s) to the terrain as determined from the set of sensor information. The changes made to the maps may include permanent changes, such as changes in one or more roads at the location. The changes made to the maps may include relatively permanent changes, such as a large rock falling on the road or debris covering a portion of the road. Changes may be made to the maps based on a physical and/or temporal characteristics of the changes to the terrain. For example, a change may be made to a map for a location based on the change to a terrain of the location impacting more than a threshold area of a road at the location and/or based on the change to the terrain impacting/expected to impact the road at the location for longer than a threshold duration. A change may be made to a map based on user/system request. For example, a user or a system that detected the change at the location may provide the sensor information characterizing the location along with a request for the map to be changed. The changed (updated) map(s) may be used for vehicle navigation. For example, a changed map may be provided to a user/vehicle based on a request for a map of the location and/or the changed map may be used to determine how the user/vehicle should navigate within or through the location.

In various embodiments, the relevance engine 114 may be configured to determine relevant sensor information for a vehicle based on the set of sensor information, a position of the vehicle, and/or other information. Relevant sensor information may include a subset of the set of sensor information. Relevant sensor information may refer to one or more portions of the set of sensor information that has significance in determining navigation for the vehicle. The relevant sensor information may characterize positions of objects in a maneuver environment of the vehicle. The relevant sensor information may be determined based on identification/extraction of the portion(s) of the set of sensor information that characterizes the maneuver environment of the vehicle. For example, the relevant sensor engine 114 may determine the relevant sensor information for a vehicle to be the portion(s) of the set of sensor information that characterizes the positions and/or movements of objects within the maneuver environment of the vehicle.

A maneuver environment of the vehicle may refer to one or more physical areas of the vehicle, such as one or more portions of surroundings of the vehicle. A maneuver environment of the vehicle may include those portions of the vehicle surroundings to which the vehicle may move. A maneuver environment of the vehicle may include those portions of the vehicle surrounding in which one or more objects (e.g., other vehicles, persons, animals, traffic light) that may affect vehicle navigation may be located.

The maneuver environment of a vehicle may be defined in two-dimensions or three-dimensions. For example, the maneuver environment of a vehicle may include all areas within a certain distance of the vehicle, areas within a two or three-dimensional shape (e.g., circle, oval, sphere, triangle, pyramid, square, cube, rectangle, box, polygon, 3D polygon) centered on the vehicle, areas within a two or three-dimensional shape including but not centered on the vehicle, or areas within a two or three-dimensional shape not including the vehicle. The maneuver environment of a vehicle may include one or more portions of a road on which the vehicle is traveling. The maneuver environment of a vehicle may include one or more portions of a road which may impact the travel of the vehicle, such as a road that intersects with a road on which the vehicle is traveling. The maneuver environment of a vehicle may include one or more portions of a lane on which the vehicle is traveling. The maneuver environment of a vehicle may include one or more portions of a lane which may impact the travel of the vehicle, such as a lane near or adjacent to a lane on which the vehicle is traveling.

The relevant sensor information for the vehicle may be determined based on a movement of the vehicle. That is, both the position and the movement of the vehicle may be used to determine the relevant sensor information for the vehicle. For example, the current position of the vehicle, the direction in which the vehicle is traveling, the velocity of the vehicle, and/or the acceleration of the vehicle may be used to determine the boundary/shape of the maneuver environment of the vehicle. For instance, based on the vehicle travelling on a straight road, the maneuver environment of the vehicle may be determine to include areas within a rectangular shape in front of the vehicle. The length of the rectangular shape may change based on the speed of the vehicle. For instance, the length of the rectangular shape may be longer for a fast moving vehicle and shorter for a slow moving vehicle. As another example, a planned route of the vehicle may be used to determine the boundary/shape of the maneuver environment of the vehicle. For instance, the shape and/or size of the maneuver environment may be different for a vehicle with a planned route that goes straight through an intersection than a vehicle with a planned route that turns right at the intersection.

In various embodiments, the desired navigation engine 116 may be configured to determine one or more desired navigations of the vehicle in the maneuver environment of the vehicle based on the relevant sensor information and/or other information. A desired navigation of a vehicle may refer to a desired movement of the vehicle in the maneuver environment. A desired navigation of a vehicle may include a particular route for the vehicle to take within the maneuver environment. A desired navigation of the vehicle may include one or more maneuvers (e.g., operations, particular movements) to be performed by the vehicle and/or the driver of the vehicle within the maneuver environment. A desired navigation of the vehicle may characterize how the vehicle may be moved within the maneuver environment. For example, a desired navigation of the vehicle may characterize in what direction(s) and with what speed(s) the vehicle is desired to be moved from one location of the maneuver environment to another location of the maneuver environment. As another example, a desired navigation of the vehicle may characterize how the vehicle should be moved to enter the maneuver environment and/or exit the maneuver environment. The desired navigation of the vehicle may include one or more changes in speed and/or direction in which the vehicle is moving. The desired navigation of the vehicle may include a change in a previously determined navigation of the vehicle or the vehicle maintaining the previously determined navigation of the vehicle.

Use of the relevant sensor information to determine the desired navigation(s) of a vehicle may enable the desired navigation engine 116 to determine the desired navigation(s) based on information provided by multiple sensors. For example, the relevant sensor information used by the desired navigation engine 116 to determine the desired navigation(s) of a vehicle may include sensor information generated based on multiple sensors located in different places. For instance, for a particular vehicle, the relevant sensor information used by the desired navigation engine 116 to determine the desired navigation(s) may include sensor information generated based on sensor(s) of the particular vehicle, sensor(s) of other vehicle(s), and/or sensor(s) affixed near the particular vehicle. Use of the relevant sensor information containing sensor information generated based on sensors distributed throughout different locations may enable the desired navigation engine 116 to determine better/higher quality navigation for a vehicle than would be possible if the desired navigation engine 116 were only using the sensor information generated based on the sensor(s) of the vehicle.

For example, the relevant sensor information may contain sensor information generated based on sensors that are different from and/or located in different places than the sensor(s) of the vehicle. Such sensors may have different capabilities than the sensor(s) of the vehicle. Such sensors may be able to detect and/or measure physical properties that may not be detectable/measurable by the sensor(s) of the vehicle and/or may detect and/or measure physical properties better (e.g., with higher resolution, higher accuracy, and/or higher scan rate) than the sensor(s) of the vehicle. The relevant sensor information containing sensor information generated based on sensors distributed throughout different locations may include more information for determining the desired navigation(s) of a vehicle than is generated by the sensor(s) of the vehicle. Thus, the desired navigation engine 116 may be able to analyze more relevant information regarding the maneuver environment of the vehicle and/or more detailed information regarding the maneuver environment of the vehicle when determining the desired navigation(s) of the vehicle.

In various embodiments, the instruction engine 118 may be configured to provide one or more instructions to the vehicle based on the desired navigation of the vehicle and/or other information. The instruction(s) may characterize one or more maneuvers to be performed by the vehicle to execute the desired navigation(s). A maneuver may refer to a particular movement and/or particular operation of a vehicle. The performance of the maneuver(s) by the vehicle may include a driver of the vehicle performing one or more of the maneuvers and/or the vehicle performing the maneuvers on its own based on the provided instruction(s). An instruction may refer to information that provides details relating to a desired maneuver. For example, an instruction may describe one or more maneuvers to be performed by the driver of the vehicle to execute the desired vehicle navigation. An instruction may identify a desired maneuver to be performed by the driver and/or may provide information on how the desired maneuver is to be performed. Such instruction may be provided to the driver visually (e.g., on a display), verbally (e.g., through a speaker), and/or through other communication medium. As another example, an instruction may include one or more commands for the vehicle to perform the maneuver(s). For example, the vehicle may include an autonomous vehicle and the vehicle may perform the maneuver(s) based on the command(s) within the instruction.

Figure 2:
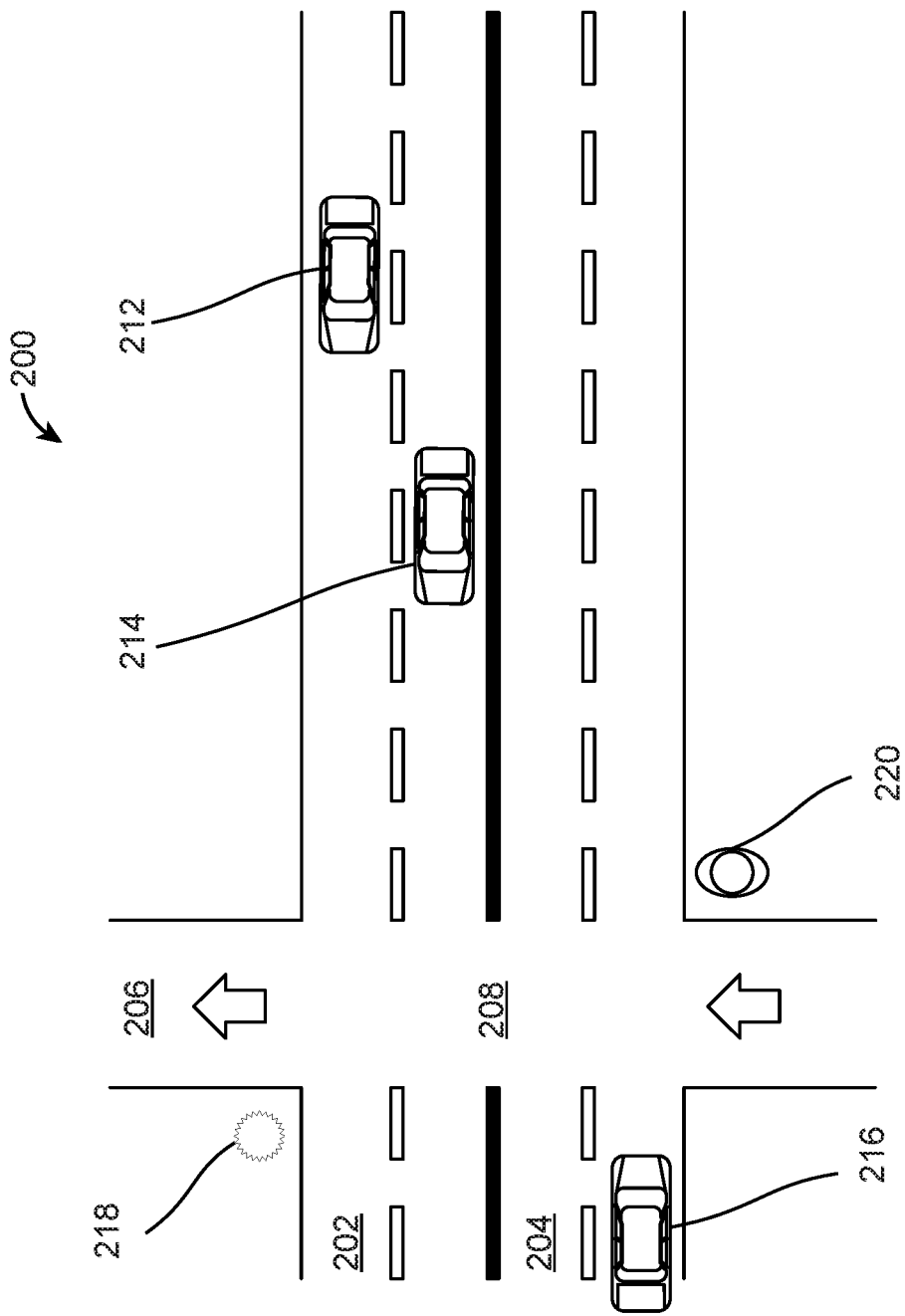
FIG. 2 illustrates an example scenario for providing vehicle navigation using distributed sensors, in accordance with various embodiments.

FIG. 2 illustrates an example scenario 200 for providing vehicle navigation using distributed sensors, in accordance with various embodiments. The scenario 200 may include an environment including roads 202, 204 206. The roads 202, 204 may individually include two lanes. The traffic on the roads 202, 204 may be traveling opposite of each other. The road 206 may include a one-way road. The roads 202, 204 and the road 206 may intersect at an intersection 208. A vehicle 212 may be on the right lane of the road 202. A vehicle 214 may be on the left lane of the road 202. A vehicle 216 may be on a right lane of the road 204. A fixed sensor 218 may be located near the upper-left corner of the intersection 208. A person 220 may be located near the lower-right corner of the intersection 208. The vehicles 212, 214, 216 may be carrying one or more sensors. Two or more of the sensors of the vehicles 212, 214, 216 and the fixed sensor 218 may be of the same type and/or different types. The capabilities of two or more of the sensors of the vehicles 212, 214, 216 and the fixed sensor 218 may be the same and/or different.

Different sensor information may be generated based on sensors of the vehicles 212, 214, 216 and/or the fixed sensor 218. Different sensor information may characterize positions of objects within the environment of the different sensors. Different sensor information may be generated based on the sensors being of different types, the sensors having different capabilities, the different positioning of the sensors within the environment, and/or other information. Different sensor information generated based on the sensors of the vehicles 212, 214, 216 and/or the fixed sensor 218 may be gathered together.

Relevant sensor information for one or more of the vehicles 212, 214, 216 may be determined based on the gathered sensor information and the positions of the vehicle(s) 212, 214, 216. The movement of the vehicle(s) may also be taken into account when determining the relevant sensor information. The relevant sensor information for the vehicle(s) 212, 214, 216 may characterize positions of objects in maneuver environment(s) of the vehicle(s) 212, 214, 216. Desired navigation(s) of one or more of the vehicles 212, 214, 216 may be determined based on the relevant sensor information, and one or more instructions may be provided to the vehicle(s) 212, 214, 216 based on the desired navigation(s) of the vehicle(s) 212, 214, 216. The instruction(s) may characterize one or more maneuvers to be performed by the vehicle(s) 212, 214, 216 to execute the desired navigation(s).

Figure 3:
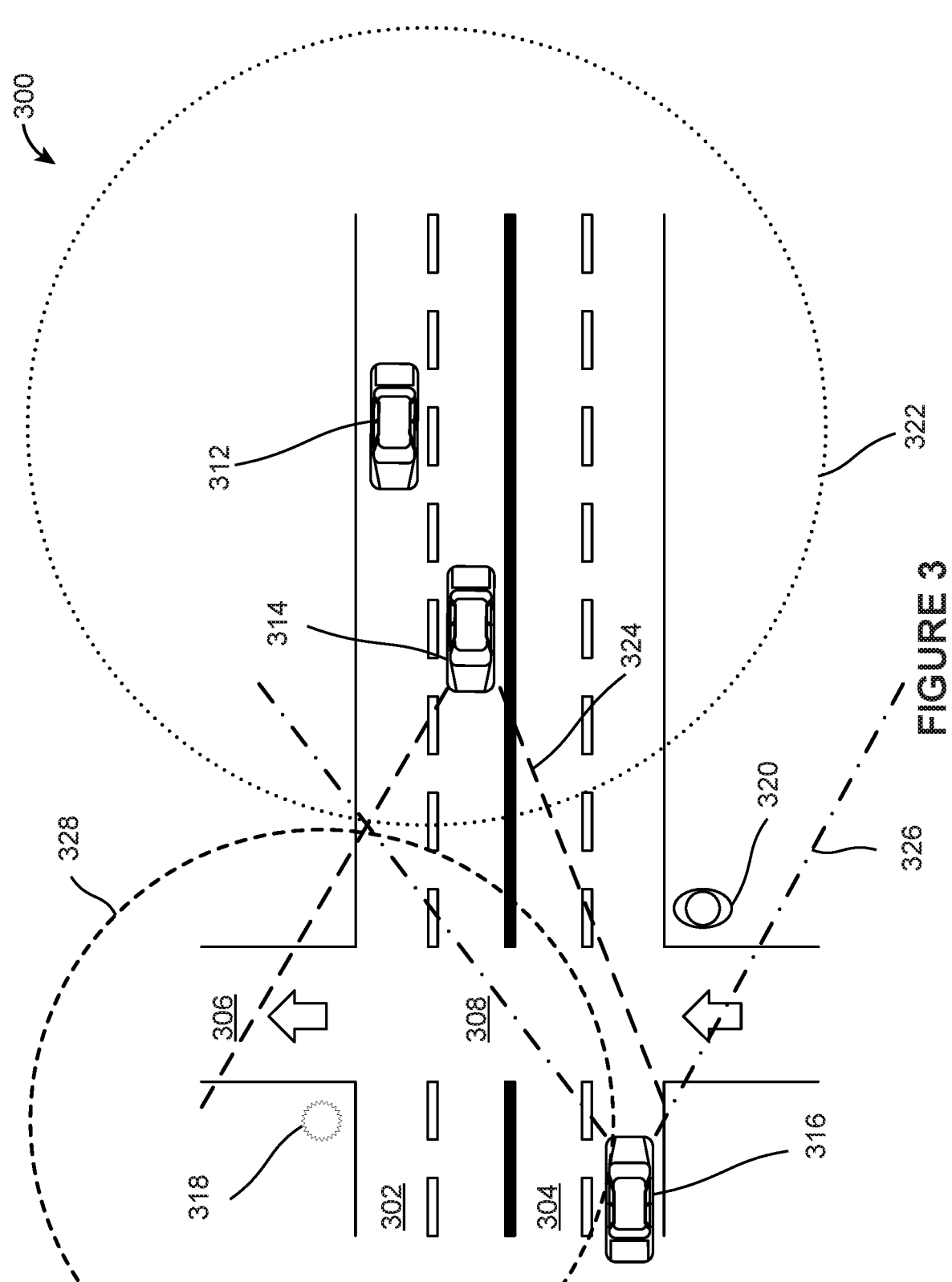
FIG. 3 illustrates an example scenario for providing vehicle navigation using distributed sensors, in accordance with various embodiments.

FIG. 3 illustrates an example scenario 300 for providing vehicle navigation using distributed sensors, in accordance with various embodiments. The scenario 300 may include an environment including roads 302, 304 306. The roads 302, 304 may individually include two lanes. The traffic on the roads 302, 304 may be traveling opposite of each other. The road 306 may include a one-way road. The roads 302, 304 and the road 306 may intersect at an intersection 308. A vehicle 312 may be on the right lane of the road 302. A vehicle 314 may be on the left lane of the road 302. A vehicle 316 may be on a right lane of the road 304. A fixed sensor 318 may be located near the upper-left corner of the intersection 308. A person 320 may be located near the lower-right corner of the intersection 308. The vehicles 312, 314, 316 may be carrying one or more sensors.

Two or more of the sensors of the vehicles 312, 314, 316 and the fixed sensor 318 may be of the same type and/or different types. For example, the fixed sensor 318 and the sensor(s) of the vehicle 312 may include LIDAR while the sensors of the vehicles 314, 316 may include image sensors (e.g., cameras). Other types of sensors are contemplated.

The capabilities of two or more of the sensors of the vehicles 312, 314, 316 and the fixed sensor 318 may be the same and/or different. For instance, the sensing technology of the LIDARs of the fixed sensor 318 and/or the vehicle 312 may be the same or different. For example, the LIDAR of the fixed sensor 318 may have smaller range of detection (covering an area 328) than the LIDAR of the vehicle 312 (covering an area 322). As another example, the LIDAR of the fixed sensor 318 and the LIDAR of the vehicle 312 may have the same scan rate. The imaging technology of the cameras of the vehicle 314, 316 may be the same or different. For example, a field of view 326 of the camera of the vehicle 316 may be wider than a field of view 324 of the camera of the vehicle 314. As another example, the resolution of the cameras of the vehicles 314, 316 may be the same. Other capabilities of sensors are contemplated.

Different sensor information may be generated based on sensors of the vehicles 312, 314, 316 and/or the fixed sensor 318. Different sensor information may characterize positions of objects within the environment of the different sensors. For example, sensor information generated based on the camera of the vehicle 316 may characterize the position of the person 320 based on the person 320 being within the field of view 326 of the camera. Sensor information generated based on the fixed sensor 318 may not characterize the position of the person 320 based on the person 320 being outside the area 328. On the other hand, the sensor information generated based on the fixed sensor 318 may characterize that the upper portions of the road 306 is empty, while the sensor information generated based on the camera of the vehicle 316 may not include information on the upper portions of the road 306. Thus, different sensor information may provide information on positions of objects and/or lack of objects in different parts of the environment shown in the scenario 300.

Figure 4A:
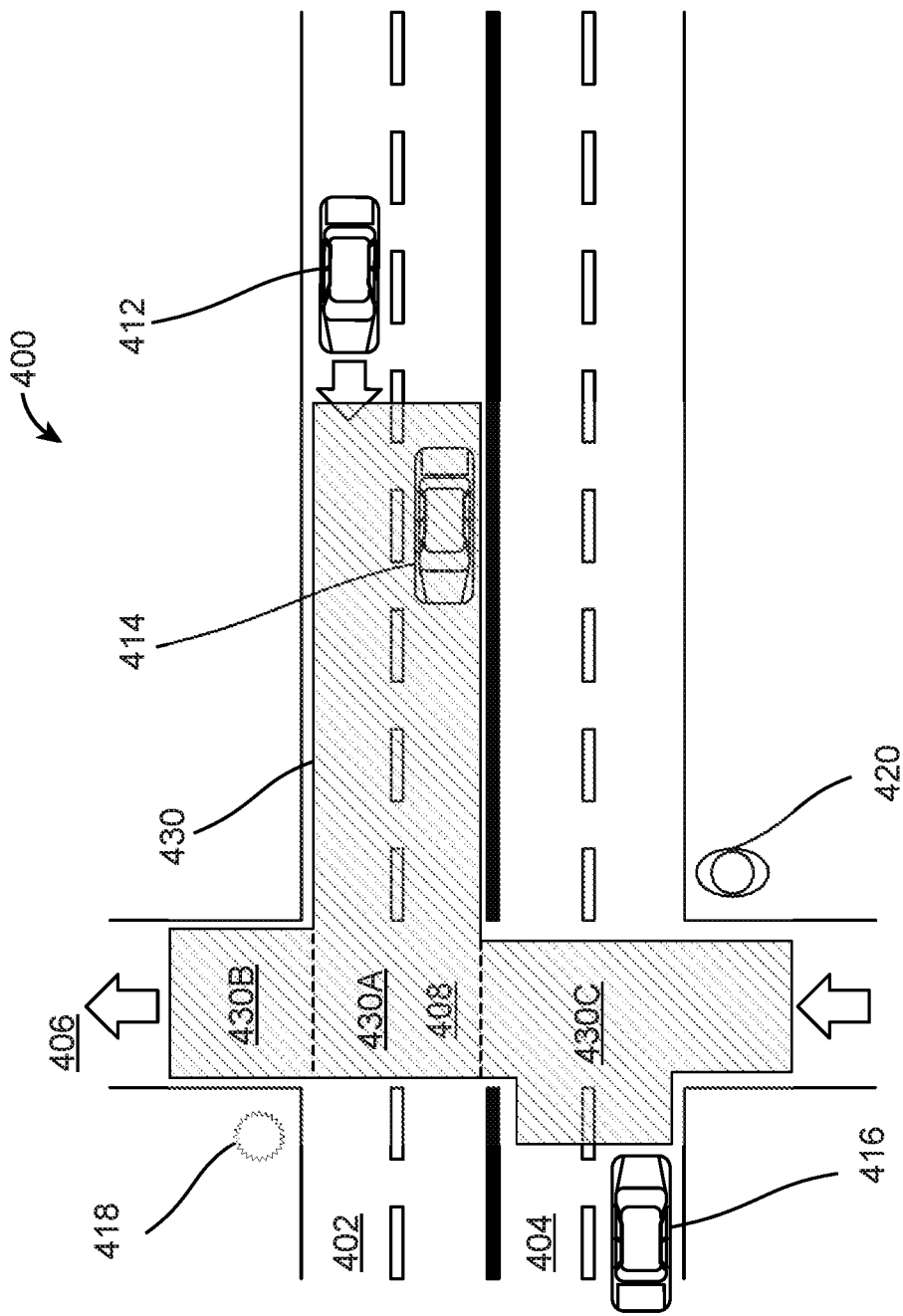
FIG. 4A illustrates an example scenario for providing vehicle navigation using distributed sensors, in accordance with various embodiments.
Figure 4B:
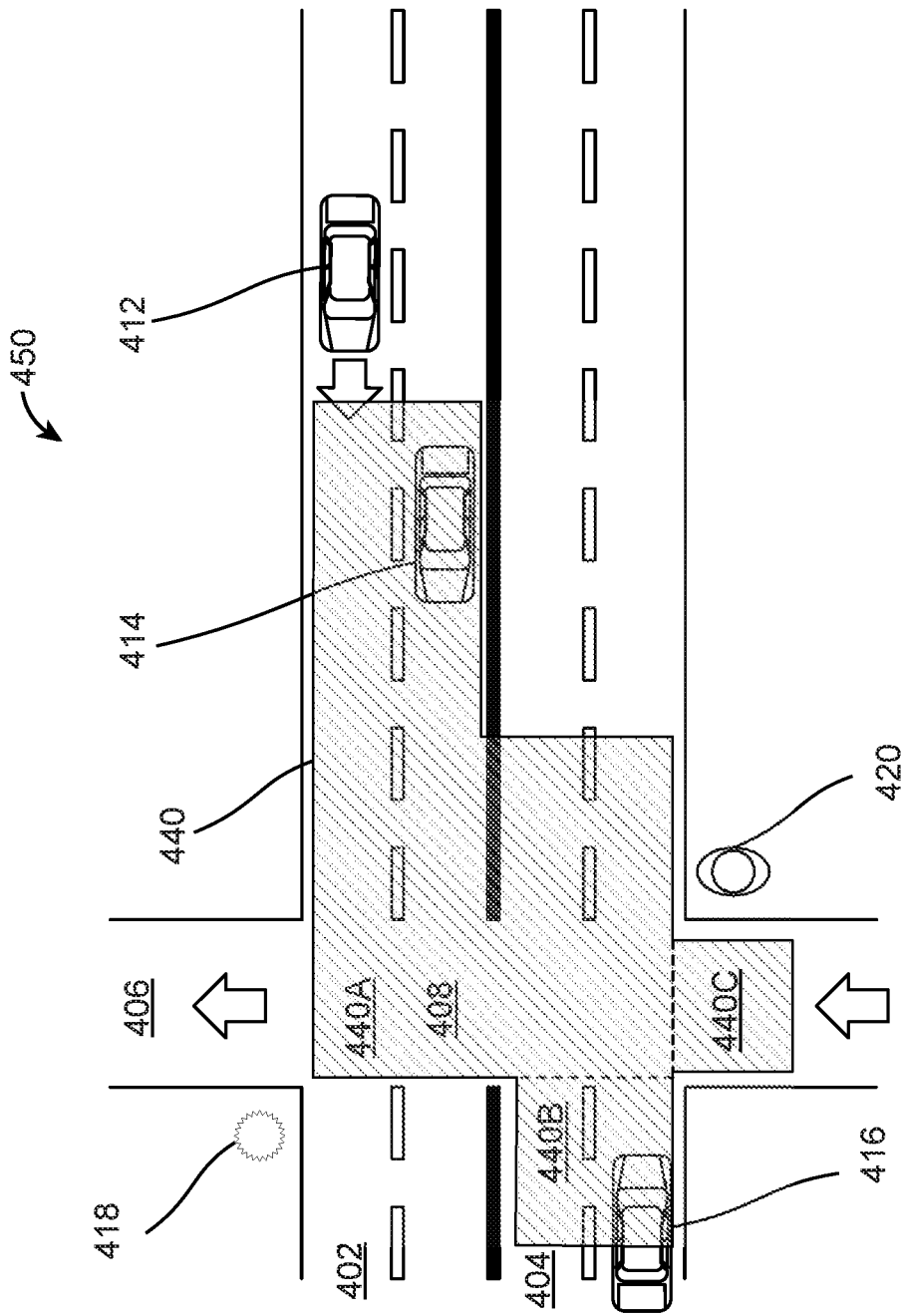
FIG. 4B illustrates an example scenario for providing vehicle navigation using distributed sensors, in accordance with various embodiments.

FIG. 4A illustrates an example scenario 400 for providing vehicle navigation using distributed sensors, in accordance with various embodiments. FIG. 4B illustrates an example scenario 450 for providing vehicle navigation using distributed sensors, in accordance with various embodiments The scenarios 400, 450 may include an environment including roads 402, 404 406. The roads 402, 404 may individually include two lanes. The traffic on the roads 402, 404 may be traveling opposite of each other. The road 406 may include a one-way road. The roads 402, 404 and the road 406 may intersect at an intersection 408. A vehicle 412 may be on the right lane of the road 402. A vehicle 414 may be on the left lane of the road 402. A vehicle 416 may be on a right lane of the road 404. A fixed sensor 418 may be located near the upper-left corner of the intersection 408. A person 420 may be located near the lower-right corner of the intersection 408. The vehicles 412, 414, 416 may be carrying one or more sensors.

Different sensor information may be generated based on sensors of the vehicles 412, 414, 416 and/or the fixed sensor 418. Relevant sensor information for one or more of the vehicles 412, 414, 416 may be determined from the different sensor information. The relevant sensor information may characterize positions of objects in maneuver environment(s) of the vehicle(s) 412, 414, 416. A maneuver environment of a vehicle may refer one or more physical areas of the vehicle, such as one or more portions of surroundings of the vehicle. A maneuver environment of the vehicle may include those portions of the vehicle surroundings to which the vehicle may move. A maneuver environment of the vehicle may include those portions of the vehicle surrounding in which one or more objects (e.g., other vehicles, persons, animals, traffic light) that may affect vehicle navigation may be located.

For example, based on the position of the vehicle 412 on the road 402, the movement of the vehicle 412 to the left, and/or a planned right-turn maneuver at the intersection 408, a maneuver environment of the vehicle 412 may be determined to include an area 430. The area 430 may include sub-areas 430A, 430B, 430C. The sub-area 430A may cover a portion of the road 402 in front of the vehicle 412 and a portion of the intersection 408. The sub-area 430B may cover a portion of the road 406 above the intersection 408. The sub-area 430C may cover a portion of the intersection 408, a portion of the road 404 to the left of the intersection 408, and a portion of the road 406 below the intersection 408.

The coverage of the area 430 by the maneuver environment may allow for determination of vehicle navigation for the vehicle 412 that takes into account positions of objects within the area 430. For instance, based on the position of the vehicle 412 on the road 402, the movement of the vehicle 412 to the left, and/or a planned right-turn maneuver at the intersection 408, the vehicle navigation for the vehicle 412 may be determined based on positions of objects in the area 430 to account for the positions of objects in front of the vehicle 412 on the road 402 up to and including the intersection 408, the positions of the objects on the road 406 above the intersection 408 (e.g., detecting objects that may block the vehicle 412 from making a right-turn at the intersection 408), the positions of objects to the left of the intersection 408 on the road 404 (e.g., detecting vehicles that may potentially make a left-turn on the road 406), and the positions of objects below the intersection 408 on the road 406 (e.g., detecting vehicles that may go straight through the intersection 408) to the road 406 above the intersection 408.

A different maneuver environment for the vehicle 412 may be determined. For example, based on the planned route of the vehicle 412 including a U-turn maneuver at the intersection 408, the maneuver environment for the vehicle 412 may be determined to include an area 440, as shown in FIG. 4B. The area 440 may include sub-areas 440A, 440B, 440C. The sub-area 440A may cover a portion of the road 402 in front of the vehicle 412, a portion of the intersection 408, and a portion of the road 404 to the right of the intersection 408. The sub-area 440B may cover a portion of the road 404 to the left of the intersection 408. The sub-area 440C may cover a portion of the road 406 below the intersection 408.

The coverage of the area 440 by the maneuver environment may allow for determination of vehicle navigation for the vehicle 412 that takes into account positions of objects within the area 440. For instance, based on the position of the vehicle 412 on the road 402, the movement of the vehicle 412 to the left, and/or a planned U-turn maneuver at the intersection 408, the vehicle navigation for the vehicle 412 may be determined based on positions of objects in the area 440 to account for the positions of objects in front of the vehicle 412 on the road 402 up to and including the intersection 408, the positions of objects to the right of the intersection on the road 404 (e.g., detecting objects that may block the vehicle 412 from making a U-turn at the intersection 408), the positions of objects to the left of the intersection 408 on the road 404 (e.g., detecting vehicles that may potentially go straight through the intersection 408 or make a left-turn on the road 406), and the positions of objects below the intersection 408 on the road 406 (e.g., detecting vehicles that may go straight through the intersection 408 to the road 406 above the intersection 408 or may make a right-turn on the road 404).

Figure 5:
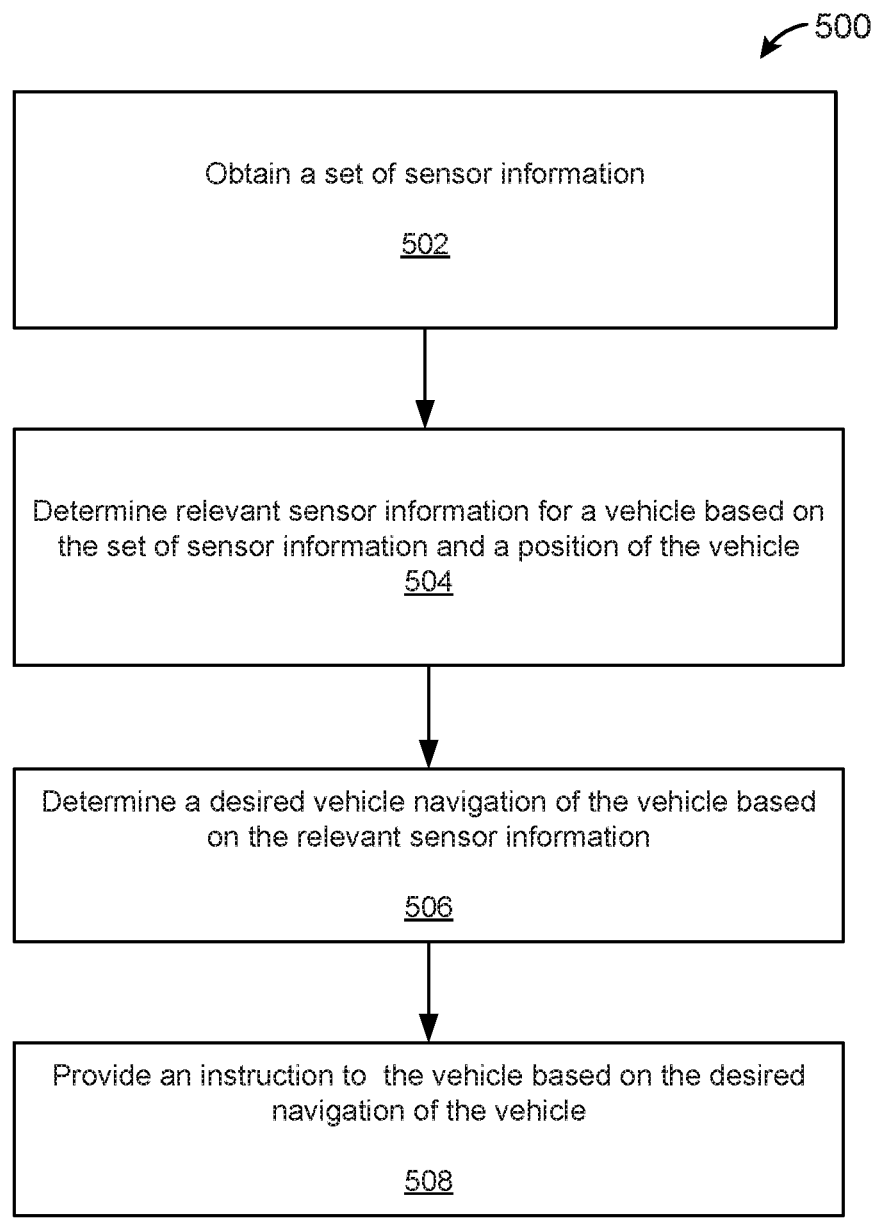
FIG. 5 illustrates a flowchart of an example method, in accordance with various embodiments.

FIG. 5 illustrates a flowchart of an example method 500, according to various embodiments of the present disclosure. The method 500 may be implemented in various environments including, for example, the environment 100 of FIG. 1. The operations of method 500 presented below are intended to be illustrative. Depending on the implementation, the example method 500 may include additional, fewer, or alternative steps performed in various orders or in parallel. The example method 500 may be implemented in various computing systems or devices including one or more processors.

At block 502, a set of sensor information may be obtained. The set of sensor information may include first sensor information generated based on a first sensor of a first vehicle and second sensor information generated based on a second sensor of a second vehicle. Individual sensor information may characterize positions of objects in an environment of individual sensors. At block 504, relevant sensor information for a vehicle may be determined based on the set of sensor information and a position of the vehicle. The relevant sensor information may characterize positions of objects in a maneuver environment of the vehicle. At block 506, a desired navigation of the vehicle in the maneuver environment of the vehicle may be determined based on the relevant sensor information. At block 508, an instruction may be provided to the vehicle based on the desired navigation of the vehicle. The instruction may characterize one or more maneuvers to be performed by the vehicle to execute the desired navigation.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
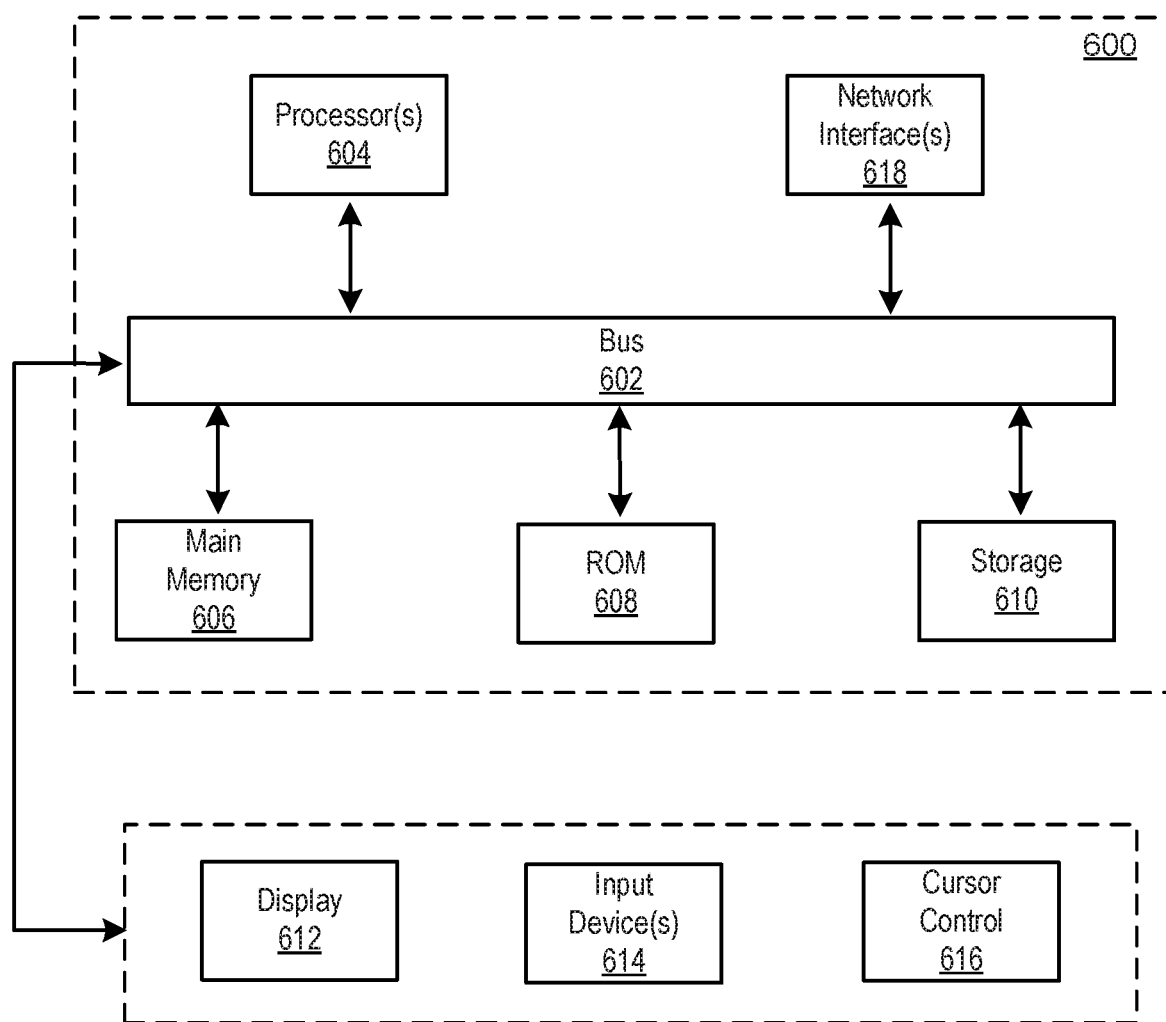
FIG. 6 illustrates a block diagram of an example computer system in which any of the embodiments described herein may be implemented.

FIG. 6 is a block diagram that illustrates a computer system 600 upon which any of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may retrieves and executes the instructions. The instructions received by main memory 606 may optionally be stored on storage device 610 either before or after execution by processor 604.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A computing system comprising:
one or more processors; and
a memory storing instructions that, when executed by the one or more processors, cause the computing system to perform:
obtaining a location and first sensor information associated with a first vehicle, wherein the first sensor information includes information relating to objects around the first vehicle;
based on a current navigation action and a planned navigation action of the first vehicle:
determining a boundary and a shape of a maneuver environment of the first vehicle based on a degree of curvature of a road through which the first vehicle is traversing, wherein the maneuver environment represents surrounding areas of planned navigation of the first vehicle and which affect the planned navigation of the first vehicle and the maneuver environment changes according to the planned navigation;
obtaining information from a second sensor disposed on a second vehicle, wherein the boundary and the shape of the maneuver environment are further determined based on a movement of the second vehicle and one or more other vehicles;
obtaining information from a third sensor, wherein the third sensor comprises a stationary, non-vehicular sensor, and wherein the second sensor, and the third sensor are within the maneuver environment, and the information from the second sensor and the information from the third sensor comprise alerts;
processing the information of the second sensor and the information of the third sensor, wherein the processing of the information comprises filtering the alerts based on degrees of severity of the alerts;
compensating, based on movement information of objects detected by the second sensor and the third sensor, the information for delays of obtaining and processing the information;
in response to compensating the information for delays, transmitting the information from the second sensor to the first vehicle and from the first sensor to the second vehicle, and transmitting the information from the third sensor to the first vehicle;
determining movements of objects around the first vehicle based on the first sensor information and based on the information from the second sensor and the third sensor;
estimating, based on the movements of the objects, and based on the delays, a subset of the objects in an environment associated with the first vehicle;
updating, by a recipient vehicle of the transmitted information, the transmitted information based on the estimated subset of the objects;
issuing a command to the first vehicle to modify the planned navigation action of the first vehicle based on the updated transmitted information; and
controlling, by the first vehicle, a navigation according to the command, wherein the navigation comprises a physical action.

2. The computing system of claim 1, wherein the first sensor information includes a change to a terrain in a location around the first vehicle; and the instructions further cause the computing system to perform:
updating a map based on the change to the terrain, an expected size of an area impacted by the change, and an expected duration of the change.

3. The computing system of claim 2, wherein the updating a map is in response to a rock being disposed in the maneuverable environment or debris covering a portion of the environment.

4. The computing system of claim 2, wherein the updating a map comprises:
determining whether the expected duration of the change to the terrain satisfies a threshold duration;
in response to determining that the expected duration of the change to the terrain satisfies the threshold duration, updating the map based on the change to the terrain; and
in response to determining that the expected duration of the change to the terrain is shorter than the threshold duration, not incorporating the change to the terrain into the map.

5. The computing system of claim 2, wherein the updating a map comprises:
determining whether the size of the area satisfies a threshold size;
in response to determining that the size of the area satisfies the threshold size, updating the map based on the change to the terrain; and
in response to determining that the size of the area is smaller than the threshold size, not incorporating the change to the terrain into the map.

6. The computing system of claim 1, wherein the estimating the subset of the objects in the environment associated with the first vehicle is based on an acceleration of the first vehicle.

7. The computing system of claim 1, wherein the selecting of the second sensor and the third sensor are based on an acceleration of the first vehicle.

8. The computing system of claim 1, wherein the instructions further cause the one or more processors to perform transmitting entertainment information bidirectionally between the first vehicle and the second vehicle.

9. The computing system of claim 1, wherein the third sensor has a smaller range of detection compared to the second sensor.

10. The computing system of claim 1, wherein the second sensor has a different scan rate compared to the first sensor.

11. The computing system of claim 10, wherein the second vehicle is disposed behind the first vehicle, the first vehicle and the second vehicle are navigating along a curve, and the second sensor is at least partially obstructed in view by the first vehicle.

12. A method implemented by a computing system including one or more processors and storage media storing machine-readable instructions, wherein the method is performed using the one or more processors, the method comprising:
obtaining a location and first sensor information associated with a first vehicle, wherein the first sensor information includes information relating to objects around the first vehicle;
based on a current navigation action and a planned navigation action of the first vehicle:
determining a boundary and a shape of a maneuver environment of the first vehicle based on a degree of curvature of a road through which the first vehicle is traversing, wherein the maneuver environment represents surrounding areas of planned navigation of the first vehicle and which affect the planned navigation of the first vehicle and the maneuver environment changes according to the planned navigation;

obtaining information from a second sensor disposed on a second vehicle, wherein the boundary and the shape of the maneuver environment are further determined based on a movement of the second vehicle and one or more other vehicles;

obtaining information from a third sensor, wherein the third sensor comprises a stationary, non-vehicular sensor, and wherein the second sensor, and the third sensor are within the maneuver environment, and the information from the second sensor and the information from the third sensor comprise alerts;

processing the information of the second sensor and the information of the third sensor, wherein the processing of the information comprises filtering the alerts based on degrees of severity of the alerts;

compensating, based on movement information of objects detected by the second sensor and the third sensor, the information for delays of obtaining and processing the information;

in response to compensating the information for delays, transmitting the information from the second sensor to the first vehicle and from the first sensor to the second vehicle, and transmitting the information from the third sensor to the first vehicle;

determining movements of objects around the first vehicle based on the first sensor information and based on the information from the second sensor and the third sensor;

estimating, based on the movements of the objects, and based on the delays, a subset of the objects in an environment associated with the first vehicle;

updating, by a recipient vehicle of the transmitted information, the transmitted information based on the estimated subset of the objects;

issuing a command to the first vehicle to modify the planned navigation action of the first vehicle based on the updated transmitted information; and controlling, by the first vehicle, a navigation according to the command, wherein the navigation comprises a physical action.

13. The method of claim 12, wherein the first sensor information includes a change to a terrain in a location around the first vehicle; and the method further comprises:

updating a map based on the change to the terrain, an expected size of an area impacted by the change, and an expected duration of the change.

14. The method of claim 13, wherein the updating a map comprises:

determining whether the expected duration of the change to the terrain satisfies a threshold duration;

in response to determining that the expected duration of the change to the terrain satisfies the threshold duration, updating the map based on the change to the terrain; and in response to determining that the expected duration of the change to the terrain is shorter than the threshold duration, not incorporating the change to the terrain into the map.

15. The method of claim 13, wherein the updating a map comprises:

determining whether the size of the area satisfies a threshold size;

in response to determining that the size of the area satisfies the threshold size, updating the map based on the change to the terrain; and in response to determining that the size of the area is smaller than the threshold size, not incorporating the change to the terrain into the map.

16. The method of claim 13, wherein the change to the terrain comprises a road closure or a road repair.

17. The method of claim 12, wherein the instructions further cause the computing system to perform:

characterizing an action of a person inside the first vehicle; and modifying a desired navigation of the second vehicle based on the characterized action of the person inside the first vehicle.

18. A non-transitory computer readable medium comprising instructions that, when executed, cause one or more processors to perform:

obtaining a location and first sensor information associated with a first vehicle, wherein the first sensor information includes information relating to objects around the first vehicle;

based on a current navigation action and a planned navigation action of the first vehicle:

determining a boundary and a shape of a maneuver environment of the first vehicle based on a degree of curvature of a road through which the first vehicle is traversing, wherein the maneuver environment represents surrounding areas of planned navigation of the first vehicle and which affect the planned navigation of the first vehicle and the maneuver environment changes according to the planned navigation;

obtaining information from a second sensor disposed on a second vehicle, wherein the boundary and the shape of the maneuver environment is further determined based on a movement of the second vehicle and one or more other vehicles;

obtaining information from a third sensor, wherein the third sensor comprises a stationary, non-vehicular sensor, and wherein the second sensor, and the third sensor are within the maneuver environment, and the information from the second sensor and the information from the third sensor comprise alerts;

processing the information of the second sensor and the information of the third sensor, wherein the processing of the information comprises filtering the alerts based on degrees of severity of the alerts;

compensating, based on movement information of objects detected by the second sensor and the third sensor, the information for delays of obtaining and processing the information;

in response to compensating the information for delays, transmitting the information from the second sensor to the first vehicle and from the first sensor to the second vehicle, and transmitting the information from the third sensor to the first vehicle;

determining movements of objects around the first vehicle based on the first sensor information and based on the information from the second sensor and the third sensor;

estimating, based on the movements of the objects, and based on the delays, a subset of the objects in an environment associated with the first vehicle;

updating, by a recipient vehicle of the transmitted information, the transmitted information based on the estimated subset of the objects;

issuing a command to the first vehicle to modify the planned navigation action of the first vehicle based on the updated transmitted information; and controlling, by the first vehicle, a navigation according to the command, wherein the navigation comprises a physical action.

\* \* \* \* \*